(12) United States Patent
Suelzer

(10) Patent No.: US 6,941,886 B1
(45) Date of Patent: Sep. 13, 2005

(54) MARINE PEST DETERRENT

(75) Inventor: Griffin T. Suelzer, 701 Lake Dr., Coldwater, MI (US) 49036

(73) Assignee: Griffin T. Suelzer, Coldwater, MI (US)

( * ) Notice: Subject to any disclaimer, the term of this patent is extended or adjusted under 35 U.S.C. 154(b) by 0 days.

(21) Appl. No.: 10/802,711

(22) Filed: Mar. 17, 2004

(51) Int. Cl.7 .............................................. B63B 17/00
(52) U.S. Cl. ........................ 114/343; 114/364; 52/101
(58) Field of Search ........................ 52/101; 114/343, 114/364, 361

(56) References Cited

U.S. PATENT DOCUMENTS

| | | | |
|---|---|---|---|
| 1,751,176 A | 3/1930 | Rystrom | |
| 2,596,678 A | 5/1952 | Gross, Jr. | ................... 177/311 |
| 3,292,319 A | 12/1966 | McCarthy | ..................... 52/101 |
| 3,799,105 A * | 3/1974 | Porter | ....................... 116/22 A |
| 4,074,653 A | 2/1978 | Pember | ..................... 116/22 A |
| 4,131,079 A | 12/1978 | Rousseau, Jr. et al. | ..... 116/22 A |
| D303,225 S | 9/1989 | Niebling, Sr. | .............. D10/109 |
| D328,806 S | 8/1992 | Tucker et al. | .............. D30/199 |
| 5,343,651 A | 9/1994 | Chatten | ........................... 43/1 |

* cited by examiner

Primary Examiner—Stephen Avila
(74) Attorney, Agent, or Firm—Taylor & Aust, P.C.

(57) ABSTRACT

A marine structure including a platform and a pest deterrent rotatably connected to the platform. The pest deterrent includes a hub rotatably connected to the platform and at least one arm extending radially from the hub where each arm extends from the hub at an angle above horizontal. Each arm includes an area moment of inertia and a length. A ratio of the area moment of inertia to the length is less than 0.0001 inches$^3$. Each arm further includes a wind collector at an end opposite of the hub.

11 Claims, 5 Drawing Sheets

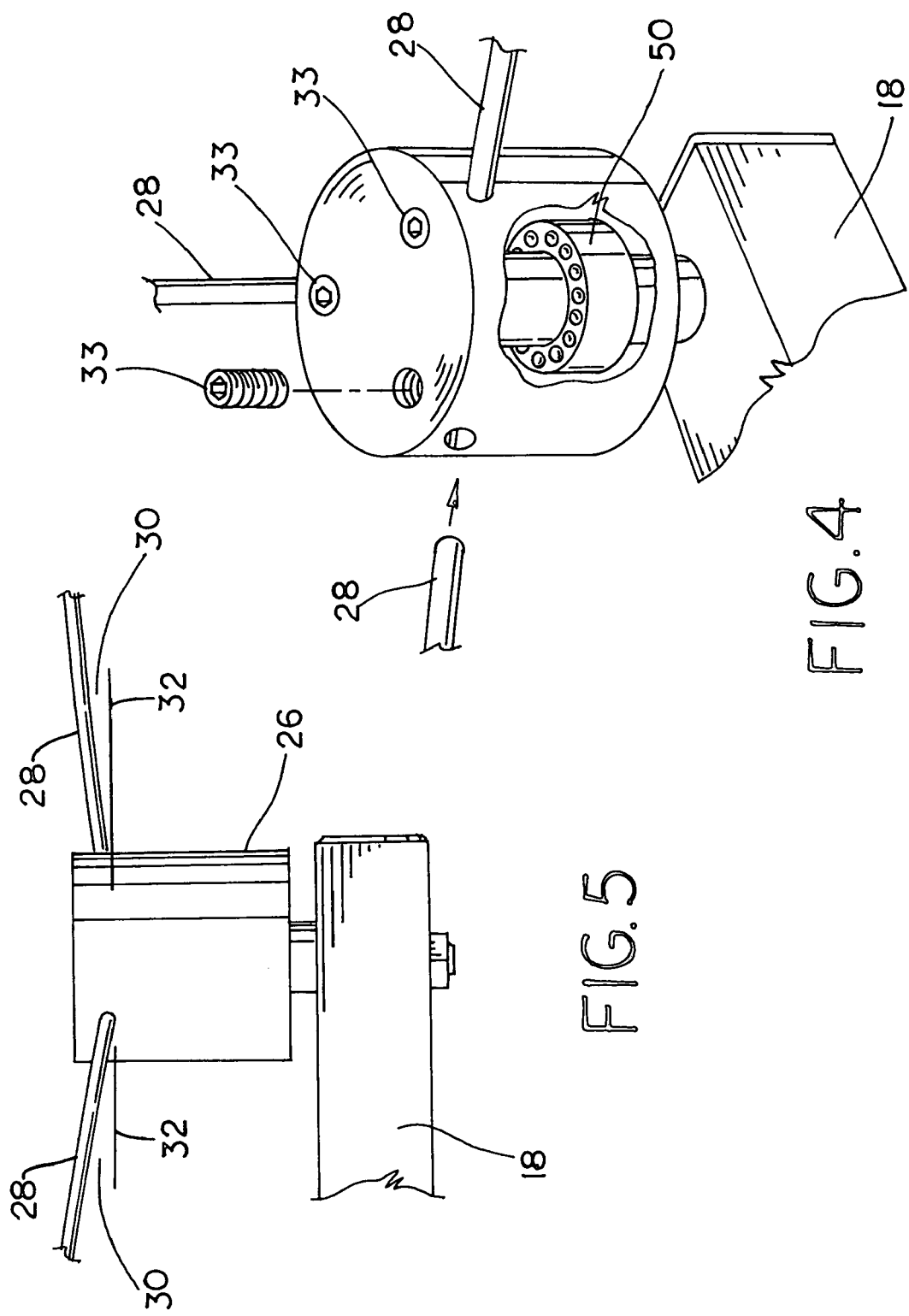

MARINE PEST DETERRENT

BACKGROUND OF THE INVENTION

1. Field of the Invention

The present invention relates to marine pest deterrents, and, more particularly, to wind operated marine pest deterrents.

2. Description of the Related Art

Boat docks are known which provide a secure location to attach docking lines from a boat to hold the boat stationary for boarding/unboarding, provisioning, and the like. Another use for docks is to provide a convenient in the water storage for boats. A boat operator can simply cast the boat away from the boat dock and make way without the need for launching the boat into the water at a ramp, for example.

Boat lifts are known which provide similar functionality and advantages of the boat dock, but additionally can lift a boat out of the water. A boat lift easily lifts the boat out of the water using the mechanical advantage of a large lift wheel or motor and thereby protects the boat from wind waves, wake waves, wind surges, wind currents, river currents, ocean currents, seasonal variations in water level and tides when the boat is not in use.

Boat docks or boat lifts can include various structures such as light poles, piers, standoffs, canopies or other covers and the like on which avian and other animals may perch, nest, eliminate waste and perform other undesirable (relative to the intended purpose of the marine structure) actions. Such undesirable actions on the part of the animal world can physically damage the marine structures. Further, as boat owners are known that keep their marine equipment "bristol", the undesirable actions on the part of the animal world create additional work for the owner and/or can generally disturb the owner's sense of well being.

Similarly, the boats themselves can include biminis, dodgers and other covers, and a variety of structures on which the animal world can meet their undesirable actions. For example, squirrels are known to nest in mainsails. This can be convenient for the squirrel because the squirrel can shred the mainsail to provide the nesting material; however, imagine the boat owner's grief when the wind is blowing and they are ready for a beautiful summer sail but instead find a squirrel's nest and a hole in their mainsail. It is obviously desirable to deter the animal world from such unwanted actions.

A further consideration is a boat, particularly a recreational boat, spends far more time at a boat lift, boat dock or mooring than in actual use. Likewise, a boat dock or boat lift is accessible typically for the entire boating season. Both of these considerations imply that there is ample opportunity for damage to the marine equipment relative to the undesirable actions of the pests.

Mock predator deterrents, such as a paper mache or plastic owl, are known but they have the disadvantage of losing their effectiveness in a relatively short period of time once the pest realizes the mock predator provides no real threat. These deterrents also have the disadvantage of coming apart which can provide an environmental hazard.

Relative to noise deterrents, a sea gull for example, can become accustomed to the noise deterrent once the gull becomes familiar with the noise. Noise deterrents also have the disadvantage of, while not being a very effective pest deterrent, being a remarkably effective neighbor annoying device.

Rotating deterrents are known but have the disadvantage of providing only a rotation of the device. Further, such devices are limited in that they can be mounted to only one type of marine structure.

What is needed in the art is a marine pest deterrent which does not loose its effectiveness, which is environmentally friendly, which requires no utility power to operate, which does not annoy a boat owner's neighbor, which is aesthetically pleasing to the boat owner and neighbors, which can be mounted to a variety of marine structures, which is reliable in service, which is economical to manufacture and which provides a complex motion deterrent.

SUMMARY OF THE INVENTION

The present invention provides a marine pest deterrent with both a rotational and vertical motion due to its novel structure.

The invention comprises, in one form thereof, a marine structure including a platform and a pest deterrent rotatably connected to the platform. The pest deterrent includes a hub rotatably connected to the platform and at least one arm extending radially from the hub where each arm extends from the hub at an angle above horizontal. Each arm includes an area moment of inertia and a length. A ratio of the area moment of inertia to the length is less than 0.0001 inches$^3$. Each arm further includes a wind collector at an end opposite of the hub.

An advantage of the present invention is a marine pest deterrent which does not loose its effectiveness.

Another advantage of the present invention is a marine pest deterrent which is environmentally friendly.

Yet another advantage of the present invention is a marine pest deterrent which requires no utility power to operate.

A further advantage of the present invention is a marine pest deterrent which can be mounted to a variety of marine structures.

A further advantage of the present invention is a marine pest deterrent which is aesthetically pleasing to the boat owner and neighbors.

A further advantage of the present invention is a marine pest deterrent which is economical to manufacture.

A further advantage of the present invention is a marine pest deterrent which is reliable in service.

A further advantage of the present invention is a marine pest deterrent provides a complex motion deterrent.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 4 is a perspective and partially exploded and fragmentary view of a hub detail of section 4—4 of FIG. 2;

FIG. 5 is a front view of the hub of FIG. 4 showing an angle from a horizontal relative to the positioning of the arms;

Corresponding reference characters indicate corresponding parts throughout the several views. The exemplifications set out herein illustrates one preferred embodiment of the invention, in one form, and such exemplification is not to be construed as limiting the scope of the invention in any manner.

DETAILED DESCRIPTION OF THE INVENTION

Figure 1:
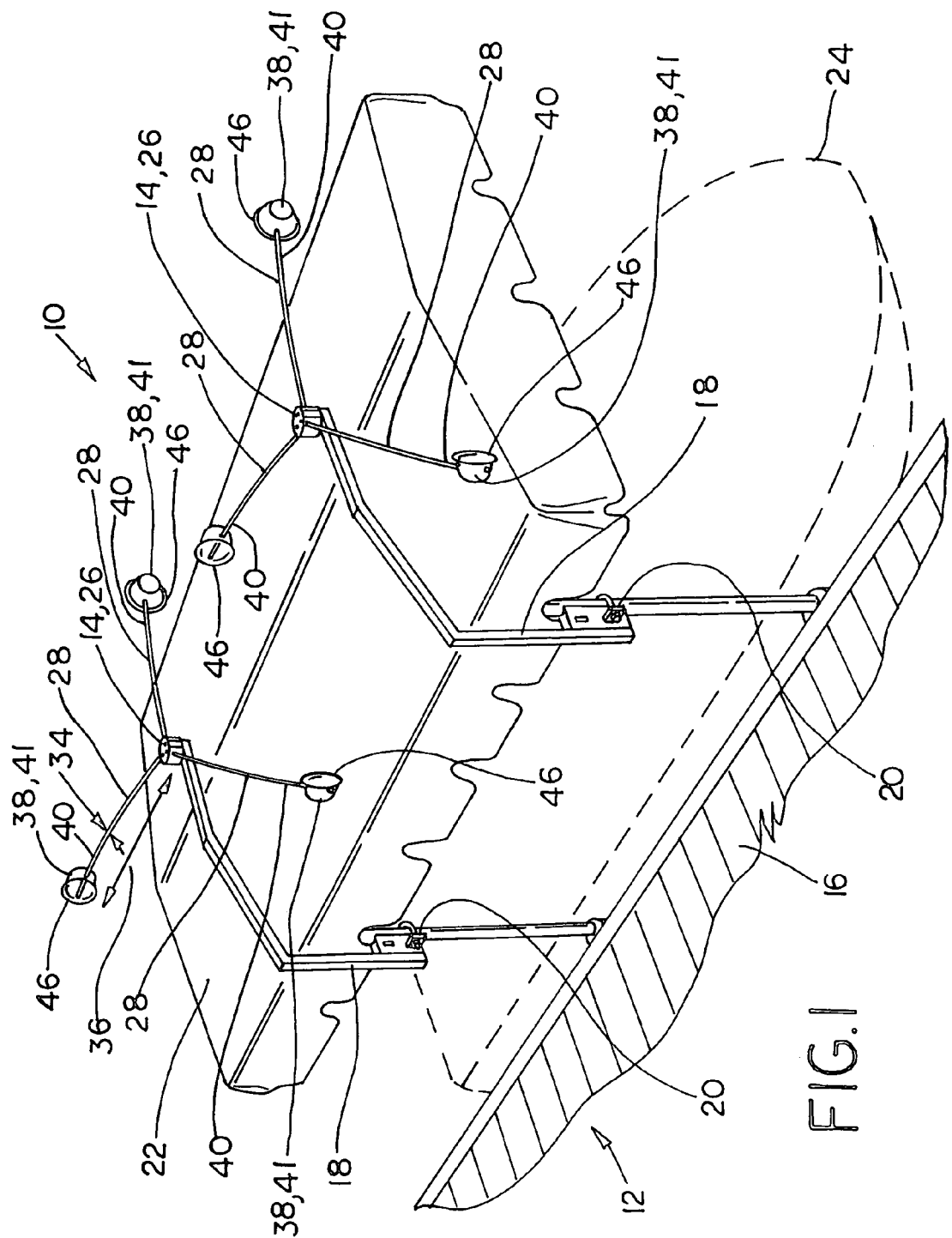
FIG. 1 is a perspective view an embodiment of the marine pest deterrent of the present invention.
Figure 2:
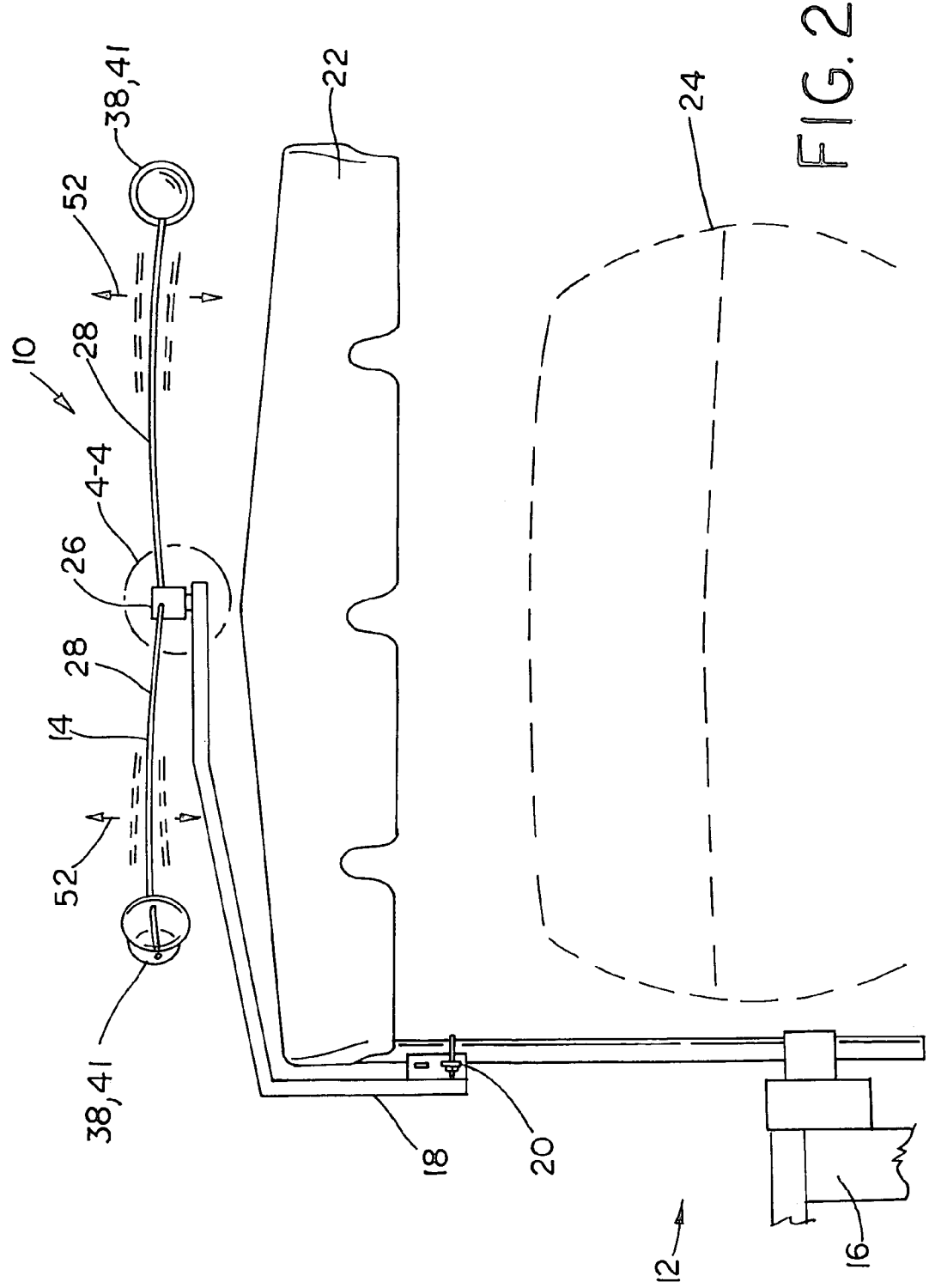
FIG. 2 is a front view of the marine pest deterrent of FIG. 1 showing the vertical motion.
Figure 3:
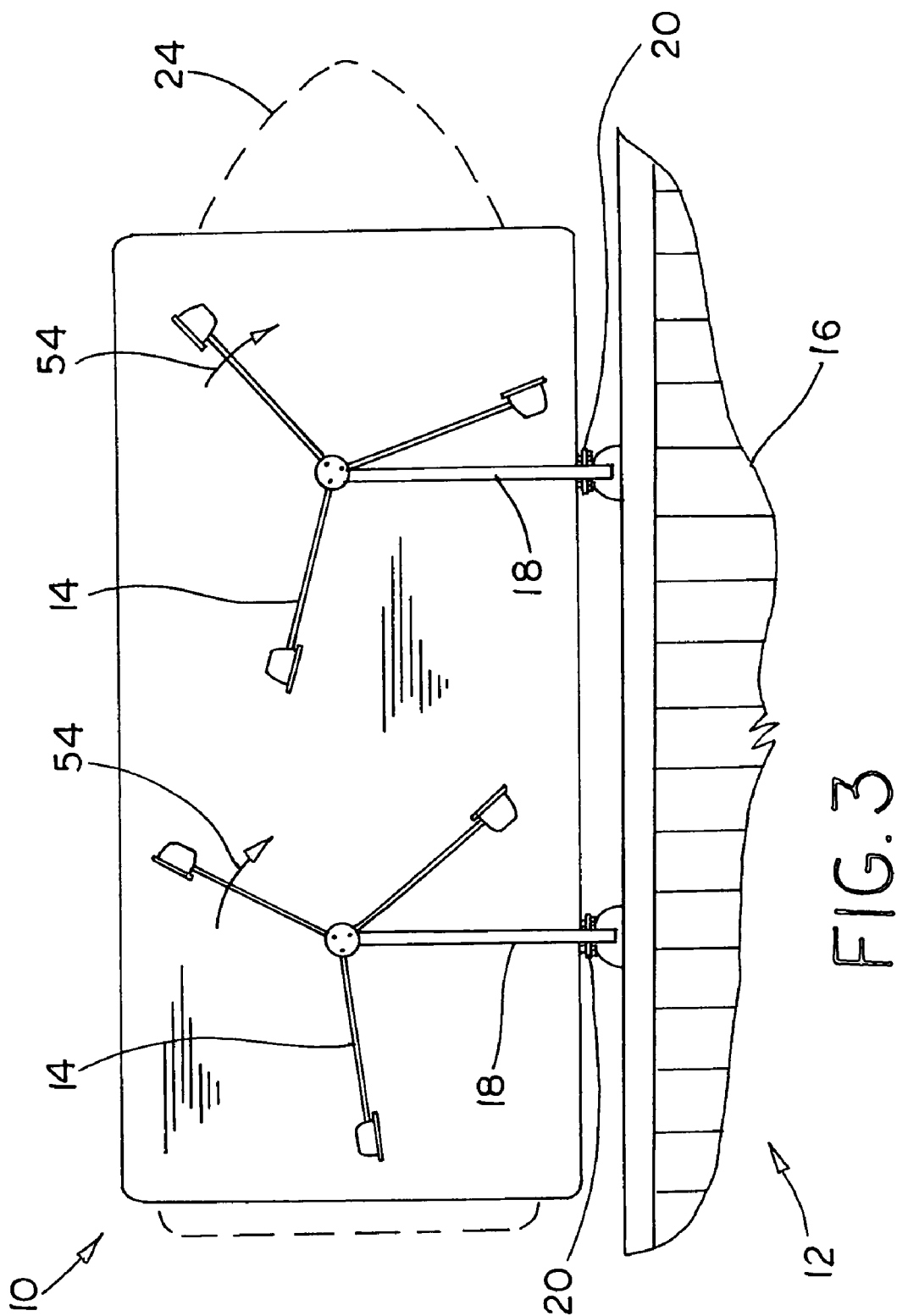
FIG. 3 is a top view of the marine pest deterrent of FIG. 1 showing the rotational motion.
Figure 7:
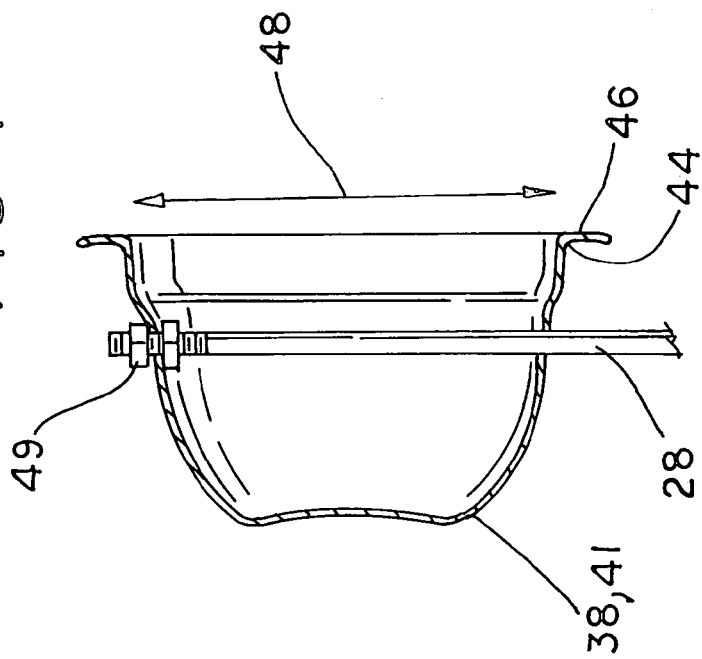
FIG. 7 is a cross-sectional view of the wind collector taken along section line 7—7 which shows an embodiment of a reliable and economical method of the present invention of attaching the wind collector to an arm.
Figure 6:
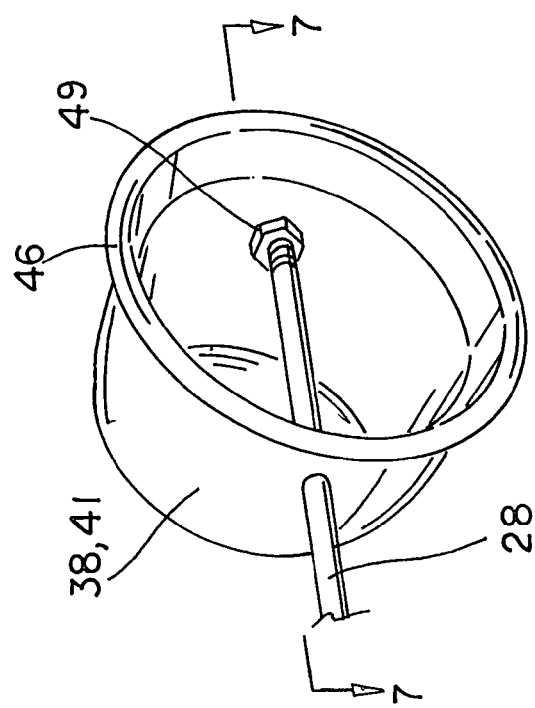
FIG. 6 is a perspective view an embodiment of a wind collector of the present invention.

Referring now to the drawings, and more particularly to FIG. 1, there is shown a marine structure 10 which generally includes a platform 12 and a pest deterrent 14 rotatably connected to platform 12.

Platform 12 includes dock 16 connected to mount 18. Mount 18 is connected to dock 16 with u-bolt assembly 20. Platform 12 can further include cover 22 under which boat 24 (dashed lines) is stored and protected from the elements. Platform 12 can be a boat lift and/or a boat dock. Alternatively, platform 12 can simply include mount 18 and u-bolt assembly 20, as when pest deterrent 14 is connected directly to a boat at a mooring, for example. In the case of a boat at a mooring, mount 18 can be connected to a stanchion, stay, cabin top, or other superstructure (all not shown) on the boat.

Pest deterrent 14 is an aerodynamic device which provides unique functionality due to its novel structure. Pest deterrent 14 includes hub 26 rotatably connected to platform 12. At least one arm 28 extends radially from hub 26. Each arm 28 extends from hub 26 at an angle 30 above horizontal 32. Arms 28 can connect to hub 26 using set screws 33. Each arm 28 includes an area moment of inertia 34 and a length 36. A ratio of area moment of inertia 34 to length 36 is less than 0.0001 inches$^3$. For example, length 36 can be equal to 45 inches. For an arm 28 having a circular cross-section with a radius of 0.125 inches, the area moment of inertia 34 can be equal to $\pi(0.125 \text{ inches})^4/4 = 1.92 \times 10^{-4}$ inches$^4$. The ratio of area moment of inertia 34 to length 36 is therefore equal to $1.92 \times 10^{-4}$ inches$^4$/45 inches=$4.26 \times 10^{-6}$ inches$^3$. Each arm 28 includes a wind collector 38 at an end 40 of arm 28 opposite hub 26. Area moment of inertia 34 is sometimes known as a second moment of area.

Angle 30 can be approximately between 2° and 20° above horizontal 32, advantageously between 7° and 9° above horizontal 32, and preferably at 8° above horizontal 32.

Wind collector 38 is shown as a cup 41. The cup shape of wind collector 38 provides aerodynamic advantage and also a convenient and ecomomical method of attachment to arm 28. Cup 41 includes an outer periphery 44 with a flange 46 which extends continuously from cup 41. Each cup 41 has a diameter 48 which is greater than 3 inches, for example. Cup 41 can be connected to arm 28 through a simple fastener arrangement 49.

A bearing 50 can be included between hub 26 and platform 12. Bearing 50 can be any one of many bearing types such as a roller bearing, slide bearing, needle bearing and the like.

The novel combination of angle 30, the ratio of area moment of inertia 34 to length 36, the self weight of arm 28 and the weight of cup 41, all of which prestresses arm 28, provides a pleasing oscillatory motion which has both a vertical motion 52 and a rotational motion 54. This pleasing oscillatory motion provides a consistent pest deterrent and is also aesthetically pleasing to both boat owners and neighbors alike.

Pest deterrent 14 is environmentally friendly because, among other reasons, it is wind driven and requires no utility power source. The aerodynamic look of pest deterrent 14 is complementary to a variety of marine devices.

In use, pest deterrent 14 is connected to a marine structure. Pest deterrent 14 includes hub 26 rotatably connected to platform 12 of marine structure 10. At least one arm 28 extends radially from hub 26 at an angle 30 above horizontal 32. Each arm 28 includes an area moment of inertia 34 and a length 36. A ratio of area moment of inertia 34 to length 35 is less than 0.0001 inches$^3$. Each arm 28 includes a wind collector 38 at an end 40 of arm 28 opposite hub 26. Each arm is prestressed with a self weight, a weight of a corresponding wind collector 38 and extending arm 28 at angle 30. As the wind actuates pest deterrent 14, hub 26 is rotated about platform 12, and wind collectors 38 are oscillated. The oscillation of wind collectors 38 includes both vertical motion 52 and rotational motion 54. Vertical motion 52 at least partially results from the prestressing of arm 28.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A marine structure, comprising:
    a platform;
    a pest deterrent including a hub rotatably connected to said platform, at least one arm extending radially from said hub, each said arm extending from said hub at an angle above horizontal when each said arm is in an operational position, each said arm including an area moment of inertia and a length, a ratio of said area moment of inertia to said length is less than 0.0001 inches$^3$, each said arm including a wind collector at an end opposite said hub.

2. The marine structure of claim 1, wherein said platform is at least one of a boat lift and a boat dock.

3. A marine structure, comprising:
    a platform;
    a pest deterrent including a hub rotatably connected to said platform, at least one arm extending radially from said hub, each said arm extending from said hub at an angle above horizontal, each said arm including an area moment of inertia and a length, a ratio of said area moment of inertia to said length is less than 0.0001 inches$^3$, each said arm including a wind collector at an end opposite said hub, said angle being approximately between 2° and 20°.

4. The marine structure of claim 3, wherein said angle is approximately between 7° and 9°.

5. The marine structure of claim 1, wherein each said wind collector is a cup.

6. A marine structure, comprising:
    a platform;
    a pest deterrent including a hub rotatably connected to said platform, at least one arm extending radially from said hub, each said arm extending from said hub at an angle above horizontal, each said arm including an area moment of inertia and a length, a ratio of said area moment of inertia to said length is less than 0.0001 inches³, each said arm including a wind collector at an end opposite said hub, each said wind collector being a cup, further including an outer periphery on each said cup, each said outer periphery including a flange extending continuously from said cup.

7. The marine structure of claim 5, wherein each said cup has a diameter which is greater than 3 inches.

8. The marine structure of claim 1, further including a bearing between said hub and said platform.

9. A method of deterring marine pests, comprising the steps of:

connecting a pest deterrent to a marine structure, said pest deterrent including a hub rotatably connected to a platform of said marine structure;

extending at least one arm radially from said hub at an angle above horizontal, each said arm including an area moment of inertia and a length, a ratio of said area moment of inertia to said length is less than 0.0001 inches³, each said arm including at least one wind collector at an end opposite said hub;

prestressing each said arm with a self weight, a weight of a corresponding said wind collector and said extending step;

rotating said hub about said platform; and oscillating said at least one wind collector.

10. The method of claim 9, wherein said oscillating step includes both a vertical motion and a rotational motion of each said at least one wind collector.

11. The method of claim 10, wherein vertical motion at least partially results from said prestressing step.

* * * * *